United States Patent
Walters et al.

(10) Patent No.: US 7,062,374 B1
(45) Date of Patent: Jun. 13, 2006

(54) METHODS AND SYSTEMS TO INTERFACE NAVIGATION OPERATIONS

(75) Inventors: Thomas H. Walters, Gardner, KS (US); Cliff A. Pemble, Olathe, KS (US)

(73) Assignee: Garmin Ltd. (KY)

(*) Notice: Subject to any disclaimer, the term of this patent is extended or adjusted under 35 U.S.C. 154(b) by 136 days.

(21) Appl. No.: 10/822,331

(22) Filed: Apr. 12, 2004

Related U.S. Application Data

(62) Division of application No. 10/246,026, filed on Sep. 18, 2002.

(51) Int. Cl.
*G01C 21/26* (2006.01)

(52) U.S. Cl. .................. 701/200; 701/208; 701/213

(58) Field of Classification Search ........ 701/200–213, 701/24, 117, 23, 119; 342/357.06, 357.09, 342/357.1; 709/222–225
See application file for complete search history.

(56) References Cited

U.S. PATENT DOCUMENTS

| | | | |
|---|---|---|---|
| 5,610,821 A * | 3/1997 | Gazis et al. ............. | 455/456.5 |
| 6,370,475 B1 | 4/2002 | Breed et al. ................ | 701/301 |
| 6,377,990 B1 * | 4/2002 | Slemmer et al. ............ | 709/225 |
| 6,401,085 B1 | 6/2002 | Gershman et al. ............ | 707/4 |
| 6,405,132 B1 | 6/2002 | Breed et al. ................ | 701/301 |
| 6,502,129 B1 * | 12/2002 | Stewart et al. .............. | 709/222 |
| 6,526,352 B1 | 2/2003 | Breed et al. ................ | 701/213 |
| 6,650,995 B1 | 11/2003 | Bullock ...................... | 701/117 |
| 6,714,865 B1 | 3/2004 | Angwin et al. ............. | 701/213 |
| 6,720,920 B1 | 4/2004 | Breed et al. ................ | 342/386 |
| 6,829,532 B1 | 12/2004 | Obradovich et al. .......... | 707/4 |

* cited by examiner

*Primary Examiner*—Richard M. Camby
(74) *Attorney, Agent, or Firm*—David L. Terrell

(57) ABSTRACT

Methods and Systems are provided for interfacing to navigation operations. An application programming interface (API) library is provided having navigation modules, guidance modules, routing modules, and mapping modules. The API is accessible to customized modules operating on a portable electronic device. The customized modules are operable to selectively access and process a number of the modules using the API library while the customized modules are processing on the portable electronic device.

6 Claims, 4 Drawing Sheets

METHODS AND SYSTEMS TO INTERFACE NAVIGATION OPERATIONS

This application is a Divisional of U.S. application Ser. No. 10/246,026, filed Sep. 18, 2002, the specification of which is incorporated herein by reference.

FIELD OF THE INVENTION

The present invention relates generally to interfacing navigation operations, and in particular to portable electronic devices having customized modules which selectively access and process a number of the navigation operations within the portable electronic devices.

BACKGROUND OF THE INVENTION

A number of electronic devices used in combination with software applications and positioning systems provide navigation information to users of the devices. For example, electronic devices used within transportation vehicles provide positioning information associated with geographic locations of the devices. These same devices also provide displays that provide visual information to the users of the devices. Some devices can communicate audibly with their users. Moreover, the devices are equipped with software applications to provide routing information. By and large, the devices are stand-alone devices providing primarily only navigation information to the users, although, in recent years, the devices and their concomitant software applications have been integrated into other multipurpose devices.

In order to provide navigation information, the devices must be interfaced to positioning systems and must include receivers or transceivers to resolve position information received from the positioning systems. One type of positioning system includes Global Positioning Systems (GPS). Such systems are well known and have a variety of uses. In general, GPS is a satellite-based radio navigation system capable of determining continuous position, velocity, time, and in some instances direction information for an unlimited number of users. Formally known as NAVSTAR, the GPS incorporates a plurality of satellites which orbit the earth in extremely precise orbits. Based on these precise orbits, GPS satellites can relay their location to any number of receiving units.

The GPS system is implemented when a device specially equipped to receive GPS data begins scanning radio frequencies for GPS satellite signals. Upon receiving a radio signal from a GPS satellite, the device can determine the precise location of that satellite via one of different conventional methods. The device will continue scanning for signals until it has acquired at least three different satellite signals. Implementing geometrical triangulation, the receiver utilizes the three known positions to determine its own two-dimensional position relative to the satellites. Additionally, acquiring a fourth satellite signal will allow the receiving device to calculate its three-dimensional position by the same geometrical calculation. The positioning and velocity data can be updated in real time on a continuous basis by an unlimited number of users.

In fact, although GPS enabled devices are often used to describe navigation devices, it will be readily appreciated that satellites need not be used at all to determine a geographic position of a receiving unit, since cellular towers or any customized transmitting radio frequency towers can be deployed and combined in groups of three or more. With such a configuration, any standard geometric triangulation algorithm can be used to determine an approximate location of the receiving unit. Moreover, dead reckoning can be used to determine approximate locations of receiving units.

Yet, having a positioning enabled device will still not provide all the necessary information to make the device useful for a user of the device. To remedy this, the device also includes a number of software applications which have access to cartographic data, which can occupy large amounts of memory within the device. Cartographic data includes, byway of example only, thoroughfare identifications, intersection identifications, altitude information, depth information, landmark information, shoreline information, marine information, aeronautical information, longitude information, latitude information and the like.

Once a device is interfaced with a positioning system and has software applications with access to cartographic data, a variety of well-known operations can be performed by a number of the software applications to provide useful information to the user of the device. For example, given the appropriate cartographic data, a user can input into the device a desired destination, and software applications use navigation operations to calculate a projected route for the user to traverse in order to reach the user's inputted destination.

Additional software applications use still more navigation operations to map and lock the device's current location to a displayed map and then overlay the projected route and the current location on the displayed map. As the device travels, still other software applications use more navigation operations to provide advance guidance to the user in order to indicate which direction the user should pursue in order to stay on the projected route. Furthermore, guidance can be audibly provided from the device to the user. Of course a variety of additional navigation operations can be provided within the software applications, all of which are well known to one of ordinary skill in the art.

Existing navigation operations are packaged, distributed, or otherwise installed on existing devices within predefined and stand-alone software applications residing on the device. As a result there has been little customization with respect to existing software applications. And, the customization which has occurred is achieved by a user requesting customization from the software vendor who provides the software applications. This is so, because the navigation operations are tightly coupled and integrated during software development within the software applications. Correspondingly, each time a new customization for a software application is requested, expensive and time-consuming software development must be pursued.

Moreover, when a new electronic device, having a potentially never before encountered processing environment, is equipped to interface with a positioning system, expensive and time-consuming software development is necessary to port one or more of the navigation operations to new stand-alone software applications on the new device.

Therefore, there exists a need for more accessible navigation operations, to rapidly permit any desired customization of software applications processing on electronic devices. In addition, there is also a need for more portable navigation operations to permit rapidly deployment of software applications on new electronic devices having unique processing environments.

SUMMARY OF THE INVENTION

The above-mentioned problems for interfacing navigation operations are addressed by the present invention and will be understood by reading and studying the following specification. Methods and systems are provided for the improved interfacing of navigation operations on a portable electronic device. Each navigation operation is individually provided within an application programming interface (API) library and made accessible to customized modules operating within the portable electronic device. The methods and systems of the present invention offer an improved interface and interaction between the customized applications and the navigation operations. Thereby, permitting customized navigation-related applications to be developed rapidly, efficiently, and cost effectively.

In one embodiment of the present invention, a method to interface navigation operations is provided, wherein one or more navigation modules from a navigation library are requested. The requested navigation modules are processed in connection with a customized module. Furthermore, one or more results associated with processing the navigation modules are communicated for subsequent processing by the customized module.

In another embodiment of the present invention a method for interfacing navigation operations is provided, where a portable electronic device is used. The portable electronic device has a navigation library operable to be accessed on the portable electronic device. Moreover, an application on the portable electronic device is processed, such that the navigation library is interfaced to the application. Additionally, navigation data is acquired by processing the application, and at least a portion of the navigation data identifies a present position associated with the portable electronic device, and the present position is used to produce results necessary for further processing of the application.

In still another embodiment of the present invention, a navigation API library is provided having positioning modules associated with determining a geographic position of a portable electronic device, guidance modules associated with providing navigation information, routing modules associated with providing navigation route information, and mapping modules associated with providing mapping information. The modules are accessible to one or more customized applications operating on the device.

In yet another embodiment of the present invention a navigation interface system is provided including a portable electronic device, an application module customized to operate on the device, and a navigation library having navigation modules, guidance modules, mapping modules, and routing modules. The application module selectively interfaces with at least one of the navigation modules, the guidance modules, the mapping modules, and the routing modules.

These and other embodiments, aspects, advantages, and features of the present invention will be set forth in part in the description which follows, and in part will become apparent to one of ordinary skill in the art by reference to the following description of the invention and referenced drawings or by practice of the invention. The aspects, advantages, and features of the invention are realized and attained by means of the instrumentalities, procedures, and combinations particularly pointed out in the appended claims.

DETAILED DESCRIPTION OF THE INVENTION

Figure 1:
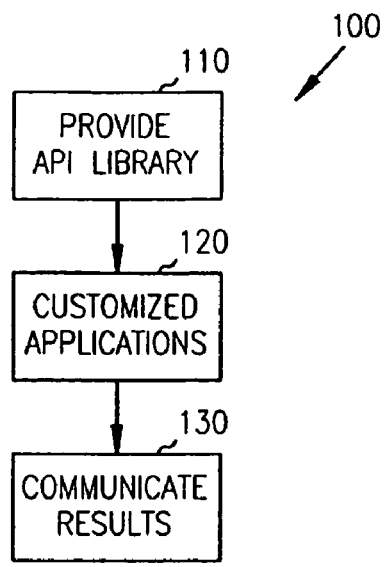
FIG. 1 is a method to interface navigation operations, according to the teachings of the present invention.

In the following detailed description of the invention, reference is made to the accompanying drawings which form a part hereof, and in which is shown, by way of illustration, specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense, and the scope of the present invention is defined only by the appended claims, along with the full scope of equivalents to which such claims are entitled.

Some portions of the detailed descriptions which follow are presented in terms of algorithms, operations, functions, and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, information, data, or the like. It should be borne in mind, however, that all of these and similar terms are to be associated with the appropriate physical quantities and are merely convenient labels applied to these quantities. Unless specifically stated otherwise and as apparent from the following discussions, terms such as "processing" or "computing" or "calculating" or "determining" or "displaying" or the like, refer to the action and processes of a processing system, or similar processing device, that manipulates and transforms data represented as physical (e.g., electronic) quantities within the processing system's registers and memories into other data similarly represented as physical quantities within the processing system memories or registers or other such information storage, transmission or display devices.

Furthermore, as used herein, a portable electronic device includes one or more processing elements coupled with computer readable memory which can be volatile or non-volatile memory or any combination thereof. The device in some embodiments, is a hand held computing device, such as a lap top, a palm top, or a personal digital assistant. In more embodiments, the device is a cell phone or an intelligent apparel device. In still other embodiments, the device is a combination of devices integrated into a single portable electronic device. Furthermore in some embodiments, the portable electronic device of the present invention is operable to be interfaced with an integrated GPS receiver, or other any other receiver or transceiver, thereby providing positioning information to a number of the API modules, which are accessible to customized applications processing on the device, for the purpose of resolving a present geographic location associated with the device.

As used herein the term "customized" refers to software executable instructions which are tailored to perform and use algorithms, operations, or functions desired by a developer of the software executable instructions. Customized can also refer to existing off-the-shelf software executable instructions which have been altered to include enhanced developer desired algorithms, operations, or functions. Moreover, the phrases "customized module," "customized application," and "application" are synonymously used herein.

Additionally, the phrase "navigation operations" refers to algorithms, operations, or functions related to navigation, including guidance operations, route generating operations, mapping operations, geographic positioning operations, gyro operations, barometer operations, and the like. Operations are embodied within modules and applications. Furthermore, an API library as used herein includes modules operable to perform one or more of the navigation operations. The API library need not be a single contiguous library as it can be logically acquired during access to the API library, and the modules provided therein. Moreover, the modules provided within the API library can be dynamically acquired or shared by one or more customized modules or applications.

For example in the WINDOWS computing environment, the API library can be provided as a dynamic linked library, and in UNIX or LINUX computing environment the API library can be provided as a shared library. Moreover in some embodiments, the modules associated with the API library can be cross-platform enabled, thereby permitting any single module to be processed in disparate computing environments. Additionally in some embodiments, the API library is distributed on removable computer readable media, though a direct connection, through a network connection, through a wireless connection, or through an application service provider (ASP).

FIG. 1 shows one method 100 of interfacing navigation operations, according to the tenets of the present invention. Initially, an API library is provided in block 110. The API library includes a plurality of navigation operations encapsulated as modules. These modules, in some embodiments, include positioning modules, guidance modules, routing modules, mapping modules, compass modules, barometer modules, gyro modules, and others.

The API library is accessible to a portable electronic device. Access in some embodiments, includes installing the API library within volatile or ion volatile memory associated with the device. In other embodiments, the API library is accessed from a removable computer readable medium in communication with the device. In still other embodiments, the API library is provided over a network such as the Internet or through an ASP. Another embodiment permits the API to be accessed via client-side scripting techniques or server-side scripting techniques.

The positioning modules provide navigation operations which interface to a positioning system associated with the device, and provide positioning information such as a present longitudinal coordinate, a present latitudinal coordinate, a present velocity, a present calendar data, and a present time of day. Furthermore in some embodiments, the positioning modules permit the association of a longitude-latitude coordinate to additional information such as, and by way of example only, a street address, a point-of-interest, a time label, or any other user-defined or custom application-defined label. In still more embodiments, the positioning modules provide satellite configurations, satellite identifications, satellite status, altitude data, depth data, and the like.

The guidance modules provide navigation operations which give guidance information related to a tracked route of the device. As is apparent to one of ordinary skill in the art, some of the guidance modules will be interfaced and in communication with the positioning modules, routing modules, the mapping modules, and other modules, as is necessitated. In some embodiments, the guidance information provided by the guidance modules include distance to next decision point, elapsed time to next decision point, available decisions approaching. Moreover, the guidance modules provide override modules to delay decisions, chose alternative decisions, or override projected decisions. Further, the guidance modules permit communication of guidance information to be configured, such that decisions can be made and communicated at user-configured or custom application-configured periods. And, communication is provided visually, audibly, or both visually and audibly.

The routing modules provide navigation operations which give user-defined or customized application desired route information. The routing modules are interfaced with the positioning modules, the guidance modules, the mapping modules, and other modules, as is necessitated. The routing modules include navigation operations to define a starting position, define an ending position, determine an optimal route from the starting and ending positions, determine an alternative route from the starting and ending positions, determine all routes from the starting and ending positions, determine an estimated time of arrival to the ending position, determine an elapsed time remaining to the ending position, and others. Moreover in some embodiments, the routing modules permit defining a desired route, or setting a default action to take when determining a route based on user-provided or customized application-provided preferences.

The mapping modules provide navigation operations which give user-defined or customized application desired map information. The mapping modules are interfaced with the positioning modules, the guidance modules, the routing modules, and other modules, as is necessitated. The mapping modules include navigation operations to draw a map, overlay user-defined or custom application-defined data on the map, set a scale level for the map, set a zoom level for the map. Furthermore in other embodiments the mapping modules permit user-defined or custom application-defined data to be associated with coordinates within the map, and permit the recording of coordinates traveled by the device to be associated with a map.

Another embodiment includes compass modules, which are interfaced to compass systems in communication with the device. The compass modules provide navigation operations associated with electromagnetic information and/or flux gate. The magnetic information is associated with the present position of the device, and in some embodiments the magnetic information is associated with a user-defined or custom application-defined coordinate within a map. Correspondingly, the compass modules are interfaced to the mapping modules, the positioning modules, and other modules, as is necessitated.

Barometer modules, are provided in some embodiment, and are interfaced to temperature or pressure sensors or systems in communication with the device. The barometer modules provide navigation operations associated with a temperature and pressure of the atmosphere where the device is located. In some embodiments, the barometer modules are interfaced to other services, such that given any particular coordinate within a map, which is selected by a user or a custom application, an atmospheric pressure and temperature are provided. Of course as will be appreciated by one of ordinary skill in the art, the barometer modules can provide any weather-related information.

Although for purposes of illustration, the above-mentioned modules were defined along with an indication as to how the modules interface with one another, it will be readily understood by reading the present disclosure, that the module description is presented for purposes of illustration only, and that each of the modules can be interfaced to one another, and a variety of additional modules related to navigation can be provided without departing from the present invention.

The modules included within the API library are accessed on a portable electronic device. In some embodiments the portable electronic device is a personal digital assistant, in other embodiments the portable electronic device is a cell phone. Of course, any portable electronic device having access to the API library of the present invention, provided in any fashion as described above (e.g., network access and the like), is intended to fall within the scope of the present invention.

In block 120, one or more customized applications are provided on the portable electronic device. Each application selectively determines which module or modules within the API library is/are desired for purposes of processing the application on the portable electronic device. The selective determination in some embodiments is achieved by dynamic calls from the application during execution to a desired module included within the API library. In other embodiments, the selective determination is achieved by compiling and/or linking the source and object code associated with the desired module from the API library into the executable application. The application includes any logic desired by a developer. Moreover, the developer decides how to incorporate navigation operations into the logic of the application by referencing as desired within the logic the appropriate API library module to perform the developer's desired task. In this way, navigation operations are readily accessible and easily incorporated into the application by the developer, and customized navigation features are provided within the application in a cost effective and seamless manner.

In block 130, any results associated with the processing the navigation modules within the customized applications are communicated to the applications, wherein the logic of the applications decide how to react or what additional processing is required based on the communicated results. Thus, the customized applications are free to use the navigation modules from the API library in any developer-defined or user-defined manner.

Figure 2:
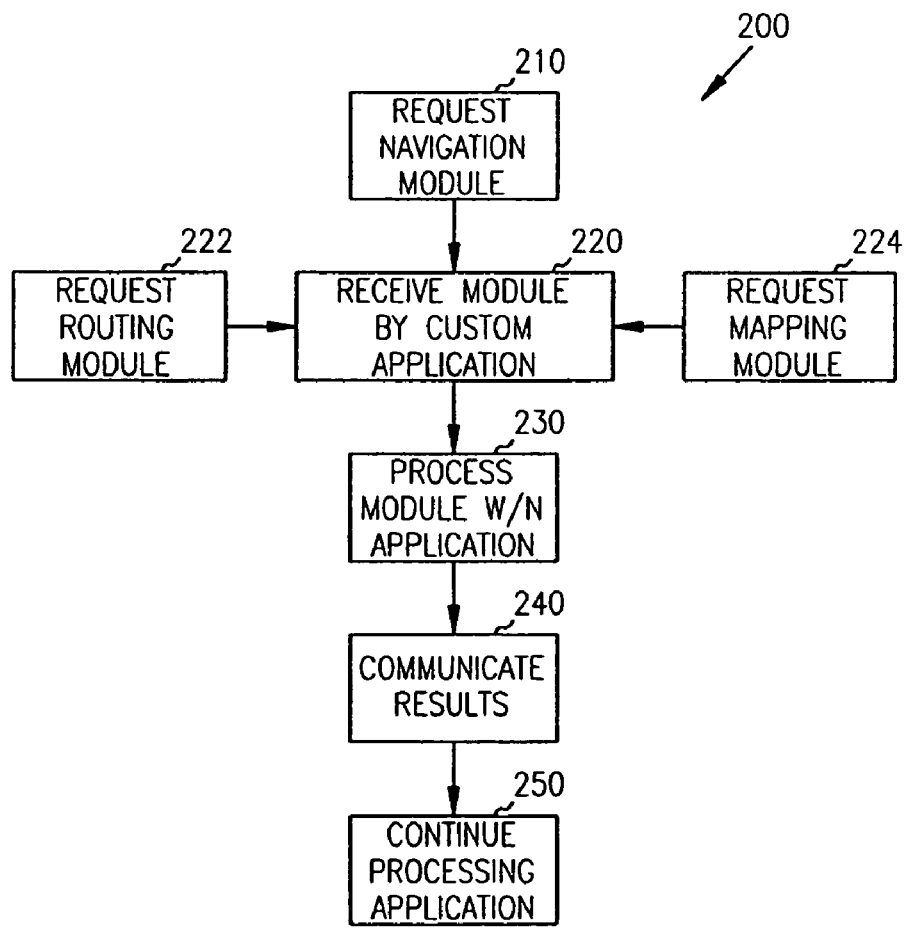
FIG. 2 is another method to interface navigation operations, according to the teachings of the present invention.

FIG. 2 shows another method 200 for interfacing navigation operations, according to the tenets of the present invention. In block 210 a request for one or more navigation modules included within a navigation library is made. In some embodiments, the request results in a customized module receiving the requested one or more navigation modules, as depicted in block 220. In other embodiments, the request includes routing modules from a routing library, as depicted in block 222 and/or mapping modules from a mapping library, as depicted in block 224. The customized module resides on a portable electronic device, and is operable to receive the navigation modules, the routing modules, and the mapping modules for processing on the portable electronic device.

The navigation modules include, in some embodiments, a get longitude navigation operation, a get latitude navigation operation, a get velocity navigation operation, and an associated longitude and latitude operation. The navigation modules are also interfaced to a positioning system associated with the portable electronic device. Moreover in one embodiment, the navigation modules include positioning modules, which assist in determining a geographic position of the portable electronic device.

The routing modules include, in some embodiments, a generate route navigation operation, a get estimated time of arrival navigation operation, and a get elapsed time to destination navigation operation. The routing modules are interfaced to the positioning system associated with the portable electronic device, the navigation modules, and the mapping modules. The routing modules provide navigation operations to generate and/or record routes as defined or desired by the customized module.

The mapping modules include, in some embodiments, a draw map navigation operation, an overlay navigation operation, a set scale navigation operation, and a set zoom navigation operation. The mapping modules are interfaced to the positioning system associated with the portable electronic device, the navigation modules, and the routing modules. The mapping modules provide navigation operations to communicate navigation information on the portable electronic device as defined by the customized module.

In other embodiments, the request includes compass modules. The compass modules provide navigation operations associated with electromagnetic and flux gate information associated with the external surroundings of the portable electronic device. In still more embodiments, the request includes barometer modules providing navigation operations associated with atmospheric temperature and pressure for the surrounding atmosphere external to the portable electronic device. In yet more embodiments, the request includes gyro modules providing navigation operations associated with providing bearing and direction information associated with an orientation of the portable electronic device.

In block 230, the requested navigation modules, routing modules, or mapping modules are processed on the portable electronic device as directed by the customized module. And, in block 240 one or more results associated with processing the navigation modules, the routing modules, or the mapping modules are communicated to the customized module. The results are then used as necessary and required by the customized module for subsequent processing of the customized module on the portable electronic device. Accordingly in block 250, the customized module continues processing after receiving the results.

Figure 3:
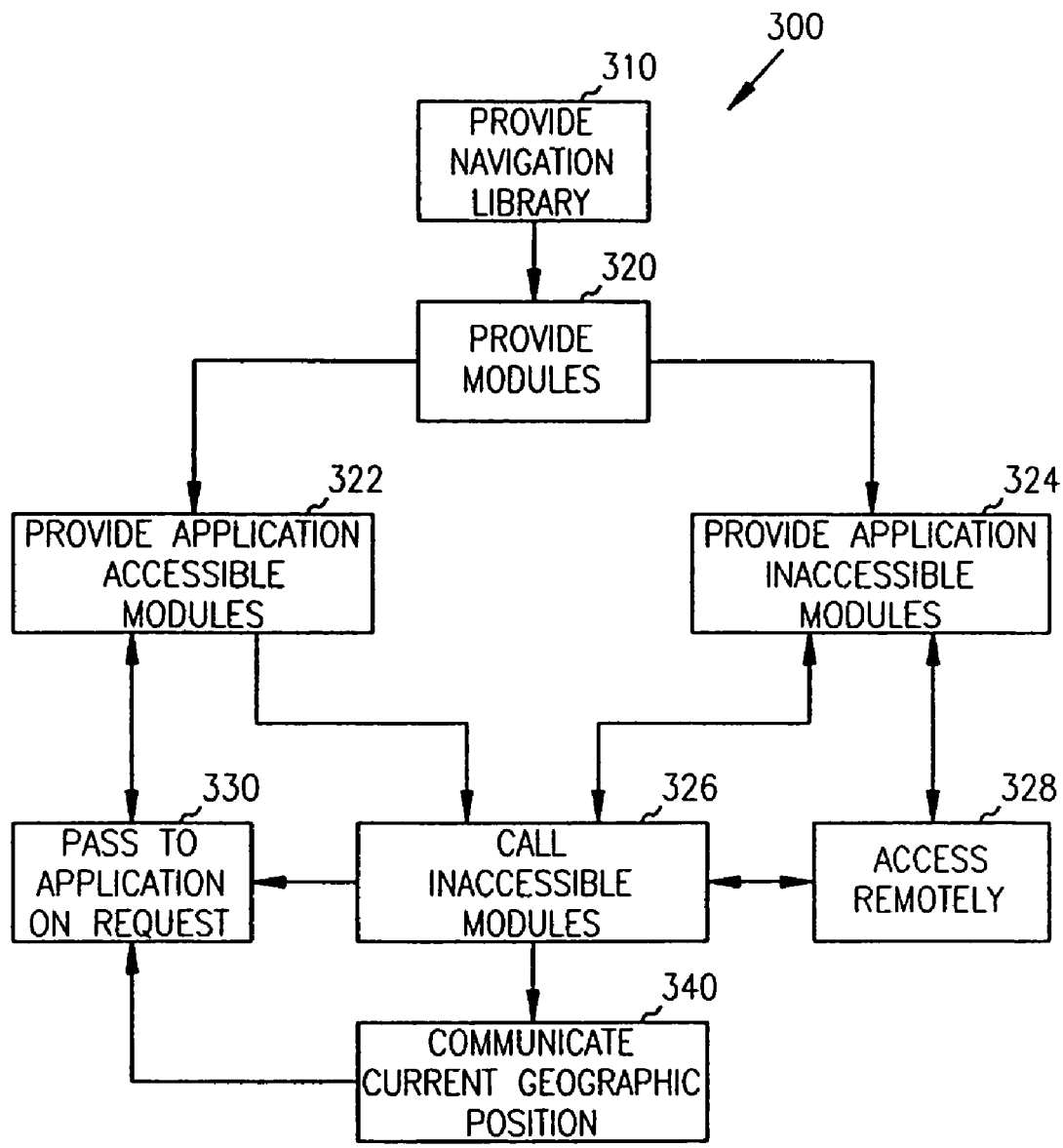
FIG. 3 is still another method to interface navigation operations, according to the teachings of the present invention.

FIG. 3 illustrates another method 300 to interface navigation operations, according to the teachings of the present invention. Initially in block 310 a navigation library is provided. The navigation library includes application accessible modules and application inaccessible modules. The application accessible modules are provided to the application in block 320. In some embodiments, the application accessible modules are operable to be directly accessed and interfaced to the application inaccessible modules in block 322, however, the application itself cannot directly access or interface to the application inaccessible modules. In this way, a higher level abstraction is provided to the application through the use of the application accessible modules, but the application need not be concerned with more finer grain details handled by the application accessible modules and the application inaccessible modules. Moreover, as will be understood upon reading the present application, the navigation library provides a programming platform/environment for the application to more easily and seamlessly interface with navigation operations embodied in the navigation library.

In block 330, access to the application accessible modules are passed to the application upon receiving a request. The application accessible modules then indirectly provide access to the application inaccessible modules in block 324. And, when directed by the application accessible modules calls are made to the application inaccessible modules through the application accessible modules, but not the application itself, as depicted in block 326. In some embodiments, the application inaccessible modules are provided remotely to the application such as, and by way of example only, through a network interface or through an ASP as depicted in block 328. Moreover, in some additional embodiments, the entire navigation library is provided remote to the application or provided on removable computer readable media.

The application accessible modules and the application inaccessible modules, include in some embodiments, routing modules, mapping modules, guidance modules, positioning modules, compass modules, barometer modules, and gyro modules. In one embodiment, the application uses one or more of the application accessible modules in connection with one or more of the application inaccessible modules to communicate a current geographic position associated with a device upon which the application is processing as depicted in block 340.

Further, the modules can be provided within the navigation library as a dynamic linked library or as a shared library to the application, within the application's programming environment. Moreover, in some embodiments the application accesses and processes the application accessible modules on a portable electronic device such as and by way of example only, a portable digital assistant or a cell phone.

As one or ordinary skill in the art will readily appreciate, in providing the customizable programming environment to a developer of an application a variety of customized applications can be rapidly and cost effectively developed. Consider by way of example only, a pizza delivery business wherein a developer customizes an application to use the navigation library to improve the operational efficiency or the delivery personnel. In such an example, a store computing device having at least some portions of the application processing thereon, is interfaced to a personal digital assistant (PDA) having at least some portions of the application processing thereon. Delivery addresses are entered into the computing device and provided to the application, wherein the application then accesses application accessible modules used by the developer within the application to create routing directions and maps which are downloaded to the delivery person's PDA. The application inaccessible modules, which are not required to be known to the developer, are accessed during the processing of the application accessible modules to facilitate the appropriate routing directions and maps to be used by the delivery person.

The delivery person's PDA, in the present example, is also GPS enabled, thereby permitting a number of the application inaccessible modules to determine a present geographic location of the PDA and communicate this information to a number of the application accessible modules within the application during the delivery person's deliveries. The present geographic position can be translated from a longitude and latitude coordinate to a present address by the either the application accessible modules or the application inaccessible modules. Accordingly, as the deliveries progress the delivery person is provided routing and mapping information to assist in the delivery person's navigation through the delivery route. Moreover, the application can be further customized by the developer to include phone numbers, names, expected delivery times, and other features desired by the pizza delivery business. Further, deliveries can be adjusted in real time to remove deliveries since the application, the application accessible modules, and the application inaccessible modules are processing on the PDA.

Of course it is readily apparent to one of ordinary skill in the art, that any number of customized application can be developed using the application accessible modules and the application inaccessible modules of the present invention to realize the benefits provided by readily making navigation operations available to developers of customized applications through a programming platform provided with the navigation library of the present invention. For example, a visiting health care professional, such as a nurse, can acquire routes and maps to patients during a day's visitation schedule. The nurse can also be provided integrated patient information, such as condition, prescription information, and the like.

Additionally, a PDA with a customized application using the navigation library of the present invention, can provide golf analysis to a golfer. For example, a golfer can use the navigation operations to historically analyze golf shot information for one or more holes. In this example, the navigation library provides for the recording of shot locations relative to the pins, and the customized application processes historically recorded shot locations relative to the pins to provide the golfer analyses and advice. As is again appreciated, the number and types of customized applications which can be developed using the navigation library of the present invention is potentially infinite.

Figure 4:
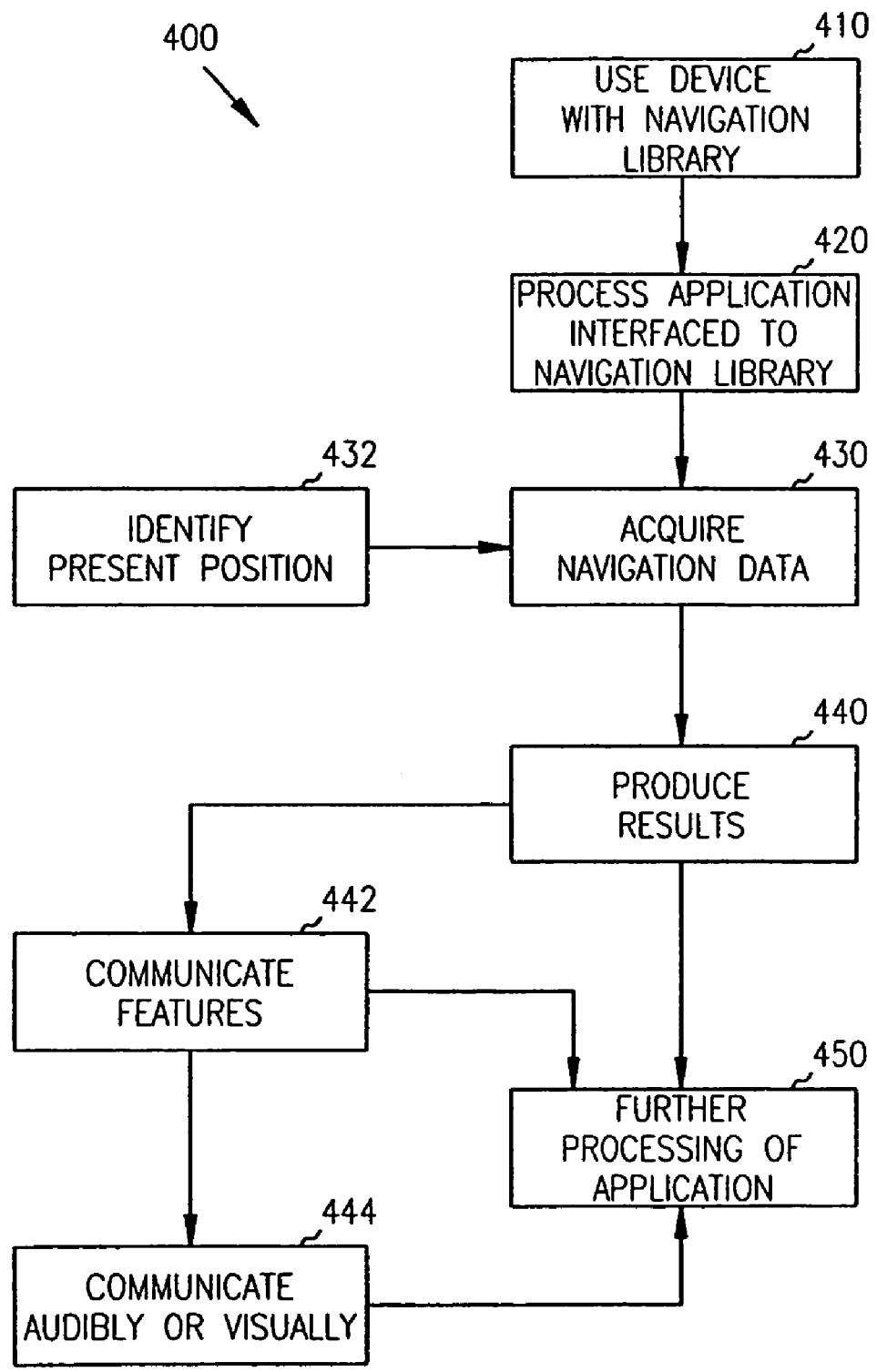
FIG. 4 is yet another method to interface navigation operations, according to the teachings of the present invention.

FIG. 4 illustrates still another method 400 to interface navigation operations, according to the teachings of the present invention. In block 410 a portable electronic device having a navigation library operable to be accessed on the portable device is used. Of course, as was previously discussed with FIG. 3, the navigation library need not be exclusively used on the portable electronic device, since the navigation library can be used in connection and in cooperation with one or more additional portable electronic devices or any computing device.

In block 420, an application is processed on the portable electronic device and the navigation library is interfaced to the application. During processing, navigation data is acquired in block 430 from the processing of the navigation operations embodied in the navigation library. The navigation data is acquired by the application, and at least a portion of the navigation data identifies a present geographic position associated with the portable electronic device as depicted in block 432. Accordingly, in some embodiments, the portable electronic device is enabled to receive positioning information from a positioning system interfaced to the device. In some embodiments the portable electronic device is a PDA or a cell phone and uses GPS, and therefore the device is GPS enabled.

The present position is used to produce results in block 440 which are necessary and consumed by the application, and the application continues in real time to process on the portable electronic device. Results are data produced from processing navigation operations embodied within the navigation library. For example, the present position can be processed by a navigation operation, embodied within the navigation library, such that upon the conclusion of processing the navigation operation the present position is mapped to a route, and the data indicative of the present position as mapped to the route is returned for further processing and consumption by the application. Of course as one of ordinary skill in the art will appreciate, innumerable examples of results can be provided, all of which are driven by results obtained from processing a navigation operation embodied in the navigation library, and all such available examples are intended to fall within the scope of the present invention.

In block 442, the results are communicated to the application as features. According to the teachings of the present invention, the features include routing features, mapping features, guidance features, positioning features, barometer features, compass features, or gyro features. In block 450, further processing or the application and its features continues. In still more embodiments, the features are communicated on the portable electronic device visually, audibly, or both visually and audibly, as depicted in block 444.

Figure 5:
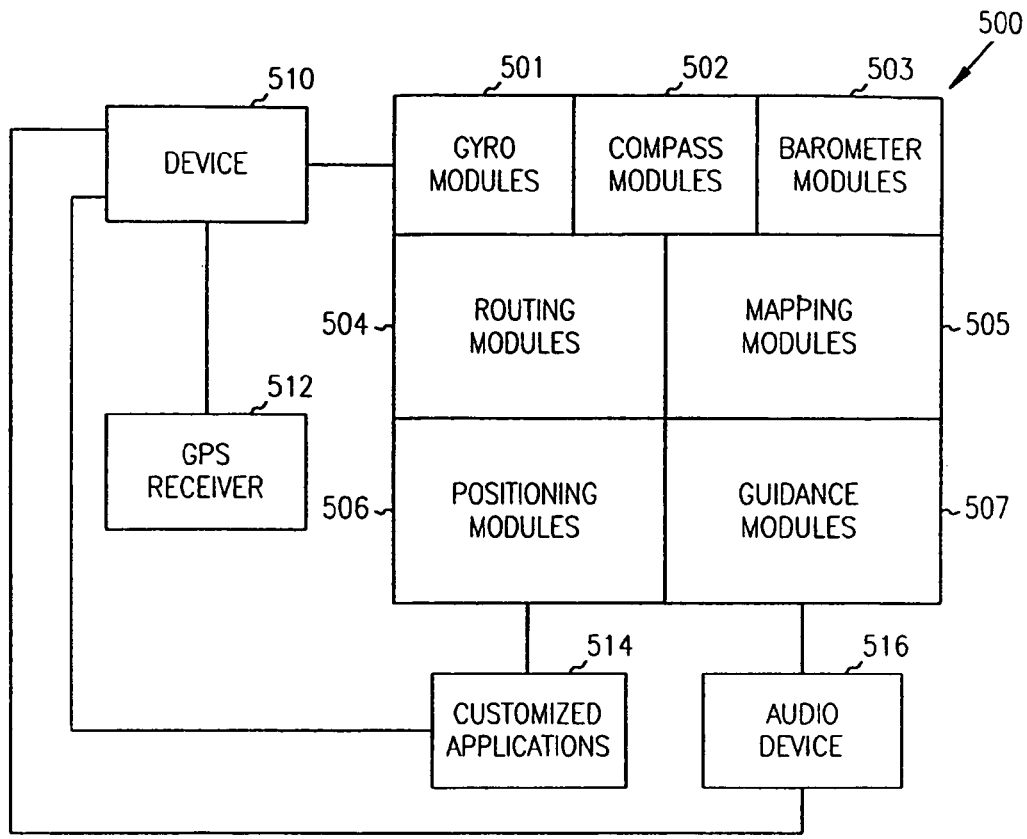
FIG. 5 is a navigation API library, according to the teaching of the present invention.

FIG. 5 illustrates one navigation API library 500, according to the teaching of the present invention. The API library 500 includes positioning modules 506 associated with determining a geographic position of a portable electronic device 510, guidance modules 507 associated with providing guidance information, routing modules 504 associated with providing route information, and mapping modules 505 associated with providing mapping information. The modules are accessible to one or more customized applications 514.

In other embodiments, the API library 500 includes compass modules 502 associated with providing magnetic information, barometer modules 503 associated with providing atmospheric pressure and temperature information, and gyro modules 501 associated with providing direction and bearing information. In these embodiments, the device 510 processing one or more of the customized applications 514 includes the appropriate interfaces and sensors to accommodate the production of magnetic information, pressure and temperature information, and direction and bearing information.

In still other embodiments, information is externally acquired from the device 510 from an external data store having the information. The acquired information can be associated with geographic locations distant from the device 510, or historical information. However, the present invention is not intended to be so limited. For example, the device, in some embodiments, is interfaced to a weather data store and service, providing temperature and climatic information associated with a distant geographic location from the device 510.

One embodiment of the API library 500 includes positioning modules 506 which are interfaced on the portable electronic device 510 to a GPS receiver 512, such that a present geographic position associated with the device 510 is resolved and determined by the positioning modules 506 and provided in the positioning information. Furthermore, the API library 500, in some embodiments is a dynamic linked library or a shared library. In another embodiment, the API library 500 resides on removable computer readable media which is in communication with the device 510.

In still more embodiments, the guidance modules are interfaced to an audio device 516 in communication with the portable electronic device 510, such that the guidance information provides audible navigation guidance to a user of the device 510. Additionally, the electronic device 510 can be equipped with a visual display operable to process the guidance information and the mapping information on the display for communication with the user of the device 510.

Figure 6:
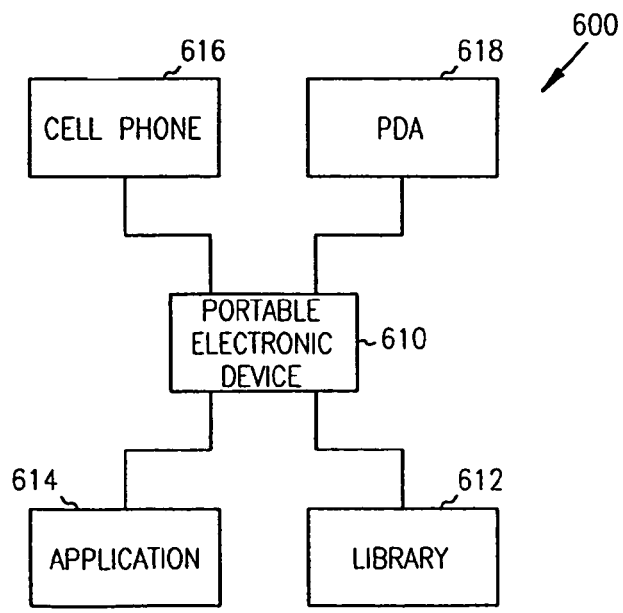
FIG. 6 is a navigation interface system, according to the teaching of the present invention.

FIG. 6 illustrates one navigation interface system 600, according to the teaching of the present invention. The system 600 includes a portable electronic device 610, an application module 614 operable to operate on the device 610, and a navigation library or API library 612 having navigation modules, guidance modules, mapping modules, and routing modules providing navigation operations.

The application module 614 is any customized set of executable instructions developed for processing on or in communication with the device 610. The application module, during normal processing, selectively identifies, calls, or otherwise uses or interfaces to at least one of the navigation modules, the mapping modules, and the routing modules. Selection is driven from the set of executable instructions associated with the application module 614. In some embodiments, the application modules 614 also selectively identifies, calls, or otherwise interfaces to at least one of a number of compass modules, barometer modules, and gyro modules, which are also provided in the navigation library 612.

In one embodiment, the portable electronic device 610 is a PDA 618 or a cell phone 616. In still other embodiments, the API library 612 is remotely provided to the device 610 or provided from a removable computer readable medium. In another embodiment, the API library 612 is accessed from an ASP while in communication with the application module 614.

It is readily appreciated by one of ordinary skill in the art, that any device 610 or combinations of devices 610 acting in concert with one another and having the ability to interface with the API library 612 of the present invention is intended to fall within the broad scope of the teachings for the present invention. Accordingly, the present invention is not intended to be limited to any particular type of device or a single device.

More specifically, in the computer-readable program embodiments, the programs can be structured in an object-orientation using an object-oriented language such as Java, Smalltalk, C++, and others, and the programs can be structured in a procedural-orientation using a procedural language such as C, PASCAL, and others. The software components communicate in any of a number of methods that are well-known to those skilled in the art, such as any additional application program interfaces (A.P.I.) or interprocess communication techniques such as remote procedure call (R.P.C.), common object request broker architecture (CORBA), Component Object Model (COM), Distributed Component Object Model (DCOM), Distributed System Object Model (DSOM) and Remote Method Invocation (RMI).

Of course it is readily appreciated by one skilled in the art that any programming methodology, programming language, programming interface, operating system, or computing environment, now known or hereafter developed can be readily deployed, without departing from the tenets of the present invention and all such implementation specific embodiments are intended to fall within the broad scope of the present invention.

CONCLUSION

The above methods and systems have been described, by way of example and not by way of limitation, with respect to improving overall access, integration and use of navigation operations within a portable electronic device. That is, the methods and systems provide an API library having a number of navigation operations embodied as navigation modules, which can further include routing modules, mapping modules, and guidance modules. Customized applications selectively interface with a number of the modules to provide desired navigation results within the confines of processing the customized applications. In this way, navigation operations are readily made available to developers in order to permit the rapid creation of a number of navigation-related customized applications in a cost effectively manner within portable electronic devices. Further, navigation operations are portable and thus easily assembled into customized applications for purposes of being installed and made available on any newly desired portable electronic device.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above systems, devices, functional data, and methods are used. The scope of the invention should be determined with reference to the appended claims, along with the full scope of equivalents to which such claims are entitled.

What is claimed is:

1. A navigation application programming interface (API) library, comprising:

a positioning module associated with determining a geographic position of a portable electronic device;

a guidance module associated with providing guidance information;

a routing module associated with providing route information; and wherein the modules are accessible to one or more customized applications operating on the device, and wherein the modules are assembled in user-defined and custom arrangements within each of the one or more customized applications.

2. The API library of claim 1, further comprising at least one of:

a mapping module associated with providing mapping information;

a compass module associated with providing magnetic information;

a barometer module associated with providing pressure and temperature information; and gyro module associated with providing direction and bearing information.

3. The API library of claim 1, wherein the positioning module interfaces with a global positioning satellite receiver in communication with the device.

4. The API library of claim 1, wherein the API library is at least one of a dynamic linked library and a shared library.

5. The API library of claim 1, wherein the guidance module is interfaced to an audio device in communication with the device to provide audible navigation guidance.

6. The API library of claim 1, wherein a number of the modules reside on a removable computer readable medium in communication with the device.

* * * * *